(12) United States Patent
Logies

(10) Patent No.: US 11,748,183 B2
(45) Date of Patent: Sep. 5, 2023

(54) REASONABLENESS MONITOR

(71) Applicant: Bell Textron Inc., Fort Worth, TX (US)

(72) Inventor: Michael Logies, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 251 days.

(21) Appl. No.: 17/067,733

(22) Filed: Oct. 11, 2020

(65) Prior Publication Data

US 2022/0114899 A1 Apr. 14, 2022

(51) Int. Cl.
*G06F 11/00* (2006.01)
*G06F 11/14* (2006.01)
*G06F 11/08* (2006.01)
*G05B 23/02* (2006.01)

(52) U.S. Cl.
CPC ........ *G06F 11/008* (2013.01); *G05B 23/0237* (2013.01); *G05B 23/0281* (2013.01); *G06F 11/08* (2013.01); *G06F 11/14* (2013.01); *G06F 2211/001* (2013.01)

(58) Field of Classification Search
CPC ........ G06F 11/008; G06F 11/08; G06F 11/14; G06F 2211/001; G05B 23/0237; G05B 23/0281
See application file for complete search history.

(56) References Cited

U.S. PATENT DOCUMENTS

| | | | | |
|---|---|---|---|---|
| 4,115,847 A * | 9/1978 | Osder | ................... | G05D 1/0077 318/564 |
| 4,412,280 A * | 10/1983 | Murphy | ................ | G06F 11/165 714/10 |
| 4,597,084 A * | 6/1986 | Dynneson | ........... | G06F 11/1616 714/E11.054 |
| 5,005,174 A * | 4/1991 | Bruckert | ................... | G06F 1/12 714/11 |
| 5,881,971 A * | 3/1999 | Hickman | ........... | G05B 23/0237 73/810 |
| 5,887,046 A * | 3/1999 | Bromley | ................... | G11C 7/00 377/33 |
| 7,840,320 B2 * | 11/2010 | Ausloos | ............. | G05B 23/0237 701/33.9 |
| 2001/0047230 A1 * | 11/2001 | Gremmert | .............. | G01C 5/005 701/4 |
| 2007/0033435 A1 * | 2/2007 | Stange | ..................... | G05B 9/03 714/15 |
| 2010/0155634 A1 * | 6/2010 | do Amaral | ......... | G05B 23/0237 73/1.72 |
| 2011/0040430 A1 * | 2/2011 | Tessier | ................. | G01C 21/183 701/3 |
| 2012/0221262 A1 * | 8/2012 | Nakagawa | ......... | G05B 23/0237 702/58 |
| 2019/0377366 A1 * | 12/2019 | Worsham, II | ......... | G01S 13/882 |
| 2022/0046114 A1 * | 2/2022 | Entelis | .................... | H04L 69/08 |
| 2022/0319342 A1 * | 10/2022 | Larminier | .............. | G01C 21/20 |

\* cited by examiner

*Primary Examiner* — Dale W Hilgendorf

(74) *Attorney, Agent, or Firm* — Lightfoot & Alford PLLC

(57) ABSTRACT

A flight control computer (FCC) has an index calculation component (ICC) configured to compare a reasonableness of at least a first value of a variable and a second value of the variable. A method of operating a flight control computer (FCC) includes providing an index calculation component (ICC) configured to compare a reasonableness of at least a first value of a variable and a second value of the variable.

16 Claims, 9 Drawing Sheets

|  | LABEL IS LOCAL IN-LINE VALID | UNIT HAS THE MOST LABEL IN-LINE VALID | OPERATING MODE IS NOT DEGRADED | GPS THRESHOLD CHECK PASSED | UNIT CLOSEST TO GPS COMPARISON REFERENCE | INDEX TOTAL |
|---|---|---|---|---|---|---|
| BITS | 16 | 8 | 4 | NA | NA |  |
| BIT NUMBER | 4 | 3 | 2 | NA | NA |  |
| AD-1 STATUS VALUE | 1 | 0 | 1 | NA | NA | 20 |
| AD-2 STATUS VALUE | 1 | 0 | 1 | NA | NA | 20 |

FIG. 6

|  | LABEL IS LOCAL IN-LINE VALID | UNIT HAS THE MOST LABEL IN-LINE VALID | OPERATING MODE IS NOT DEGRADED | GPS THRESHOLD CHECK PASSED | UNIT CLOSEST TO GPS COMPARISON REFERENCE | INDEX TOTAL |
|---|---|---|---|---|---|---|
| BITS | 16 | 8 | 4 | NA | NA |  |
| BIT NUMBER | 4 | 3 | 2 | NA | NA |  |
| AD-1 STATUS VALUE | 1 | 0 | 0 | NA | NA | 16 |
| AD-2 STATUS VALUE | 1 | 1 | 1 | NA | NA | 28 |

FIG. 7

|  | LABEL IS LOCAL IN-LINE VALID | UNIT HAS THE MOST LABEL IN-LINE VALID | OPERATING MODE IS NOT DEGRADED | GPS THRESHOLD CHECK PASSED | UNIT CLOSEST TO GPS COMPARISON REFERENCE | INDEX TOTAL |
|---|---|---|---|---|---|---|
| BITS | 16 | 8 | 4 | 2 | 1 | |
| BIT NUMBER | 4 | 3 | 2 | 1 | 0 | |
| AD-1 STATUS VALUE | 1 | 0 | 0 | 0 | 0 | 16 |
| AD-2 STATUS VALUE | 1 | 0 | 0 | 1 | 1 | 19 |

FIG. 8

|  | LABEL IS LOCAL IN-LINE VALID | UNIT HAS THE MOST LABEL IN-LINE VALID | OPERATING MODE IS NOT DEGRADED | GPS THRESHOLD CHECK PASSED | UNIT CLOSEST TO GPS COMPARISON REFERENCE | INDEX TOTAL |
|---|---|---|---|---|---|---|
| BITS | 16 | 8 | 4 | 2 | 1 | |
| BIT NUMBER | 4 | 3 | 2 | 1 | 0 | |
| AD-1 STATUS VALUE | 1 | 0 | 0 | 0 | 0 | 16 |
| AD-2 STATUS VALUE | 1 | 1 | 1 | 1 | 1 | 31 |
| AD-3 STATUS VALUE | 0 | 0 | 1 | 1 | 0 | 6 |

FIG. 9

|  | LABEL IS LOCAL IN-LINE VALID | UNIT HAS THE MOST LABEL IN-LINE VALID | OPERATING MODE IS NOT DEGRADED | GPS THRESHOLD CHECK PASSED | UNIT CLOSEST TO GPS COMPARISON REFERENCE | INDEX TOTAL |
|---|---|---|---|---|---|---|
| BITS | 16 | 8 | 4 | 2 | 1 |  |
| BIT NUMBER | 4 | 3 | 2 | 1 | 0 |  |
| AD-1 STATUS VALUE | 1 | 0 | 1 | 1 | 0 | 22 |
| AD-2 STATUS VALUE | 1 | 0 | 1 | 1 | 0 | 22 |
| AD-3 STATUS VALUE | 1 | 0 | 1 | 1 | 1 | 23 |

FIG. 10

REASONABLENESS MONITOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Aircraft often utilize sensors to inform a flight control computer of performance status value and environmental status value. Because sensors have multiple failure modes, such as, but not limited to, complete failures to report, erroneous reporting, spurious reporting, calibration drift, and/or other effective failures, redundant sensors are often employed. Even with redundant sensors, determining which sensor is reporting a best or most trustworthy status value can be difficult. Accordingly, there exists a need for an aircraft system to be able to determine which of multiple status values for a same status reported by multiple sensors is most reasonable and therefore most trustworthy.

BRIEF DESCRIPTION OF THE DRAWINGS

FIG. 6 shows a table of example calculations by index calculation components of the reasonableness monitor of FIG. 3.

FIG. 7 shows another table of example calculations by index calculation components of the reasonableness monitor of FIG. 3.

FIG. 8 shows another table of example calculations by index calculation components of the reasonableness monitor of FIG. 3.

FIG. 9 shows another table of example calculations by index calculation components of the reasonableness monitor of FIG. 3.

FIG. 10 shows another table of example calculations by index calculation components of the reasonableness monitor of FIG. 3.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
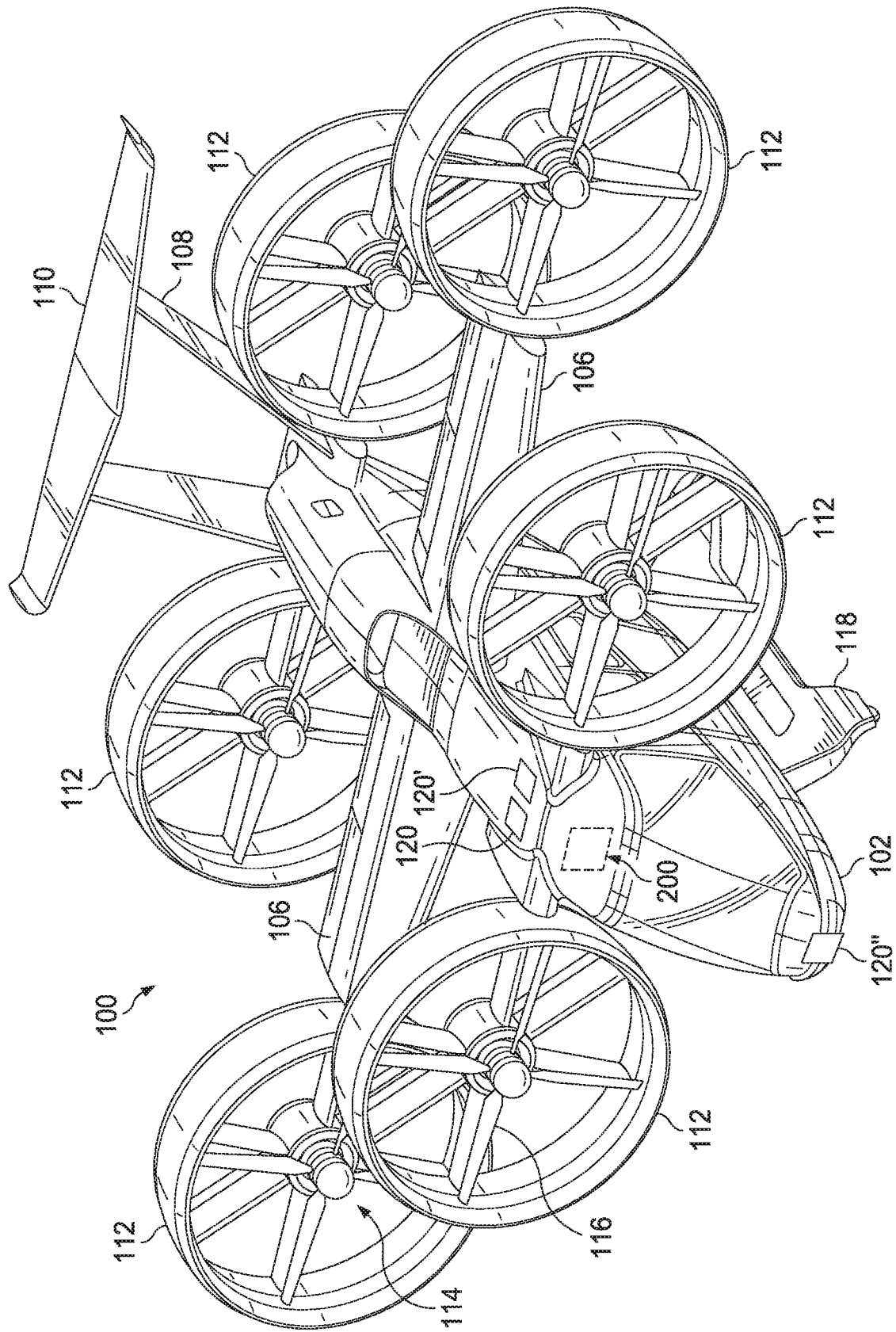
FIG. 1 is an oblique view of an aircraft comprising a flight control computer (FCC) according to this disclosure.

Referring now to FIG. 1 an aircraft 100 according to this disclosure is shown. Aircraft 100 is generally configured as a vertical takeoff and landing (VTOL) aircraft that is operable in an airplane mode associated with forward flight and a helicopter mode associated with vertical takeoff from and landing to a landing zone. Aircraft 100 comprises a fuselage 102, a cockpit 104, a plurality of wings 106 extending from the fuselage 102, and an empennage 108 having a horizontal stabilizer 110. Aircraft 100 also comprises a plurality of ducted fans 112 that may be selectively rotated with respect to the fuselage 102 in order to transition the aircraft 100 between the airplane mode and the helicopter mode.

Each ducted fan 112 comprises a rotor system 114 having a plurality of selectively rotatable rotor blades 116 configured to generate thrust when selectively rotated in each of the airplane mode and the helicopter mode. In the embodiment shown, aircraft 100 comprises six ducted fans 112. Two ducted fans 112 are carried by, supported by and/or otherwise coupled to the fuselage 102, two ducted fans 112 are coupled to the wings 106, and two ducted fans 112 are carried by, supported by, and/or otherwise coupled to the empennage 108. However, in alternative embodiments, any number of ducted fans 112 may be used depending on the configuration and design of the aircraft. Aircraft 100 also comprises a landing gear 118 configured to support aircraft 100 when not in flight. The aircraft 100 further comprises a plurality of sensor packages 120 and a flight control computer (FCC) 200 communication with the sensor packages 120 to receive environmental status values and/or aircraft performance status values. In some cases, the sensor packages 120 can comprise global positioning system (GPS) sensors, air data sensors, inertial sensors, and/or any other sensor suitable for providing useful information to the FCC 200. In this embodiment, the sensor packages 120 are configured to sense and report status values regarding barometric altitude, barometric altitude rate, indicated airspeed, computed airspeed, true airspeed, impact pressure, corrected static pressure, corrected angle of attack, and sideslip angle. Not every sensor package 120 comprises the same sensors and the sensor package 120 are additionally referred to as first sensor package 120, second sensor package 120', and third sensor package 120" to allow differentiation of the sensor packages 120 in the discussion below.

Figure 2:
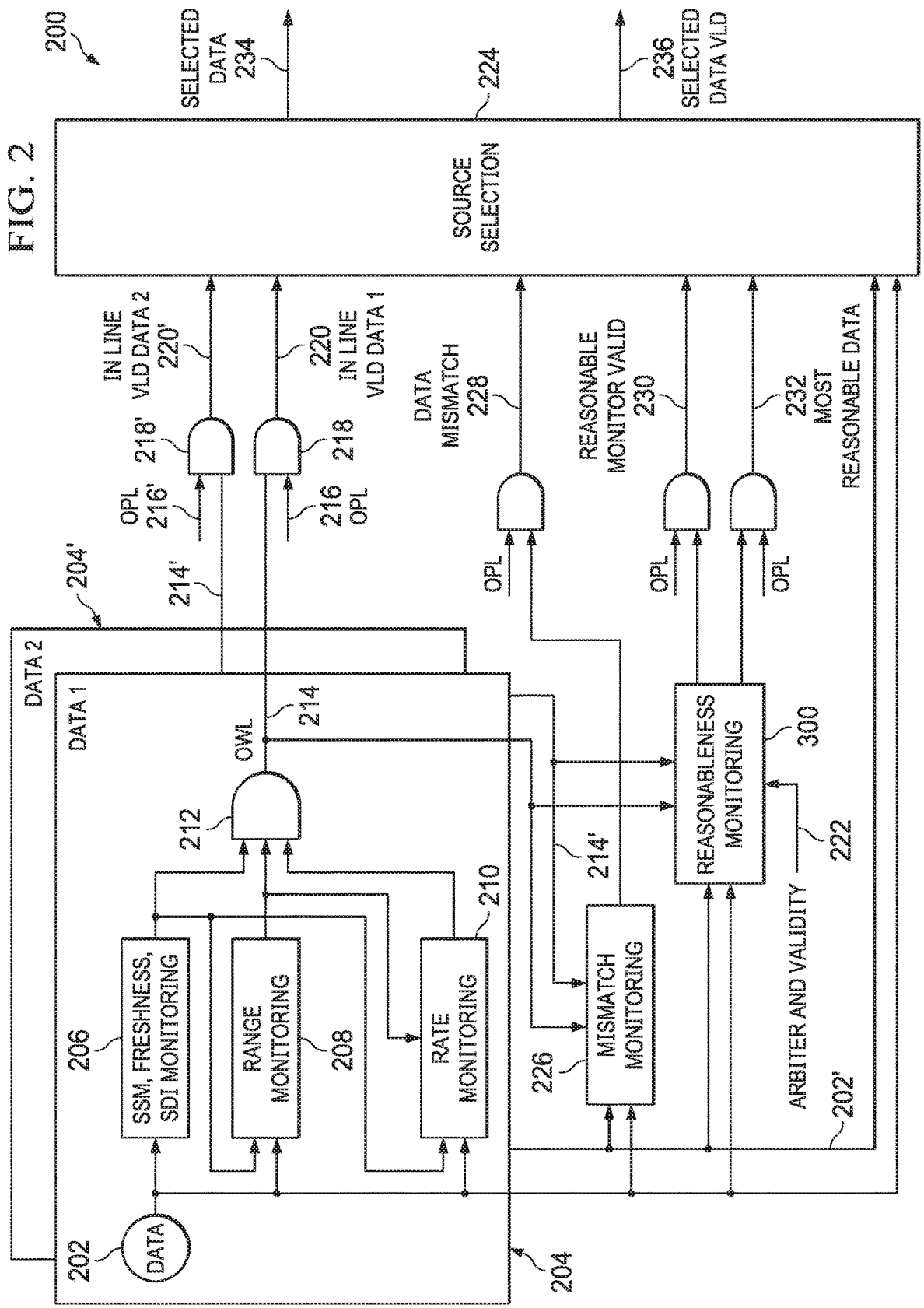
FIG. 2 is a simplified schematic of the FCC of FIG. 1.

Referring now to FIG. 2, a simplified schematic of FCC 200 is shown. The FCC 200 is configured to receive, communicate, and utilize first air data 202 and second air data 202'. The FCC 200 comprises a first air data computer 204 configured to receive, communicate, and utilize first air data 202 and a second air data computer 204' configure to receive, communicate, and utilize second air data 202'. The first air data 202 may be provided to the first air data computer 204 by the first sensor package 120. The second air data 202' may be provided to the second air data computer 204' by the second sensor package 120'. In embodiments, where an FCC comprises a third air data computer, third air data may be provided to the third air data computer by the third sensor package 120". It will be appreciated that while this embodiment refers to the sensing, communication, and utilization of air data, other types of data may be sensed by sensors, communicated to the FCC 200, and utilized by other computers of the FCC 200. Further, because the air data computers 204, 204' are meant to be redundant systems and because their operational behavior is substantially the same, the discussion of the components of and operation of second air data computer 204' can be assumed operationally the same as operation of first air data computer 204. Of course, by providing the different air data computers 204, 204' different air data 202, 202", respectively, the outputs of the different air data computers 204, 204' can differ.

Still referring to FIG. 2, first air data computer 204 comprises first air data 202 supplied to first air data computer 204 by first sensor package 120. The first air data 202 can be fed to each of a freshness monitor component 206, a range monitor component 208, and a rate monitor component 210. The freshness monitor component 206 is configured to determine whether the first air data 202 values are sufficiently recently generated. The range monitor component 208 is configured to determine whether the first air data 202 values are within a predetermined acceptable range. The rate monitor component 210 is configured to determine whether the first air data 202 values represent rates of change in the data that are within acceptable ranges of rates of change. The first air data computer 204 comprises a determination component 212 configured to generate a determination value 214 indicative of whether the first air data 202 is deemed acceptable by all three of the freshness monitor component 206, range monitor component 208, and rate monitor component 210. Depending on OPL 216, another determination component 218 provides an in-line valid signal (true or false value signal) 220 (Bit 4 when calculating an index valued as described below) to a source selection component 224 for whether the first air data 202 is in-line valid.

The FCC 200 further comprises a mismatch monitor component 226 that receives the first air data 202, second air data 202', and the outputs of the determination components 212, 212'. Depending on OPL 216, another determination component 218 provides a true or false value signal 228 indicative of whether there is a data mismatch to the source selection component 224.

Figure 3:
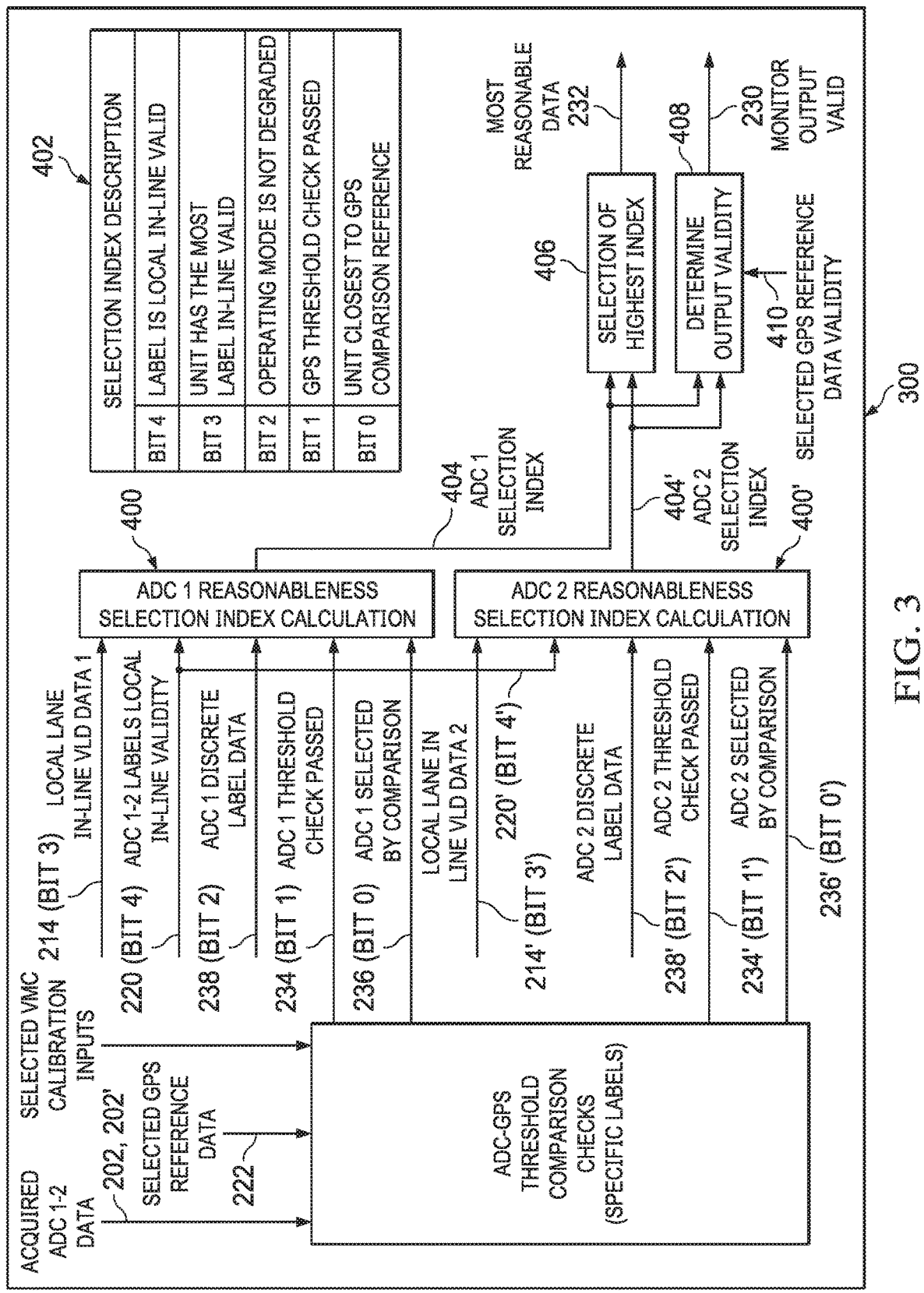
FIG. 3 is a simplified schematic of a reasonableness monitor component of the FCC of FIG. 1.

Referring to FIG. 3, the FCC 200 further comprises a reasonableness monitor component 300. A threshold and comparison check component 302 of the reasonableness monitor component 300 is fed first air data 202, second air data 202', selected GPS reference data, and selected VMC calibration inputs. The reasonableness monitor component 300 further comprises a first index calculation component 400 and a second index calculation component 400'. The first index calculation component 400 is fed local lane in-line valid data regarding first air data 202, in-line valid data 220, and first air data computer discrete label data. The first index calculation component 400 is further fed first air data computer GPS threshold check passed data 234 (Bit 1 when calculating an index value as described below), first air data computer selected by comparison data 236 (Bit 0 when calculating an index value as described below) and operating mode degradation data supplied by determination value 214 (Bit 3 when calculating an index value as described below). Further, the first index calculation component 400 is Using the received data, the first index calculation component 400 is configured to calculate a first air data bitsum value 404 (first air data computer selection index) based on the selection index descriptions 402. The second index calculation component 400' is configured to receive substantially similar data, but data associated with second air data 202'. Accordingly, the second index calculation component 400' is configured to calculate a second air data bitsum value 404' (second air data computer selection index) based on the selection index descriptions 402. The reasonableness monitor component 300 further comprises an index selection component 406 to select the higher value between the first air data bitsum value 404 and the second air data bitsum value 404'. The index selection component 406 is configured to provide the most reasonable data 232 (a value of one of the first air data 202 and the second air data 202') to the source selection component 224. The reasonableness monitor component 300 further comprises an output validity component 408 configured to receive the values 404, 404' and a selected GPS reference data validity value 410 and to provide to the source selection component 224 an output indicative of whether the reasonableness monitor component 300 output is valid.

Figure 4A:
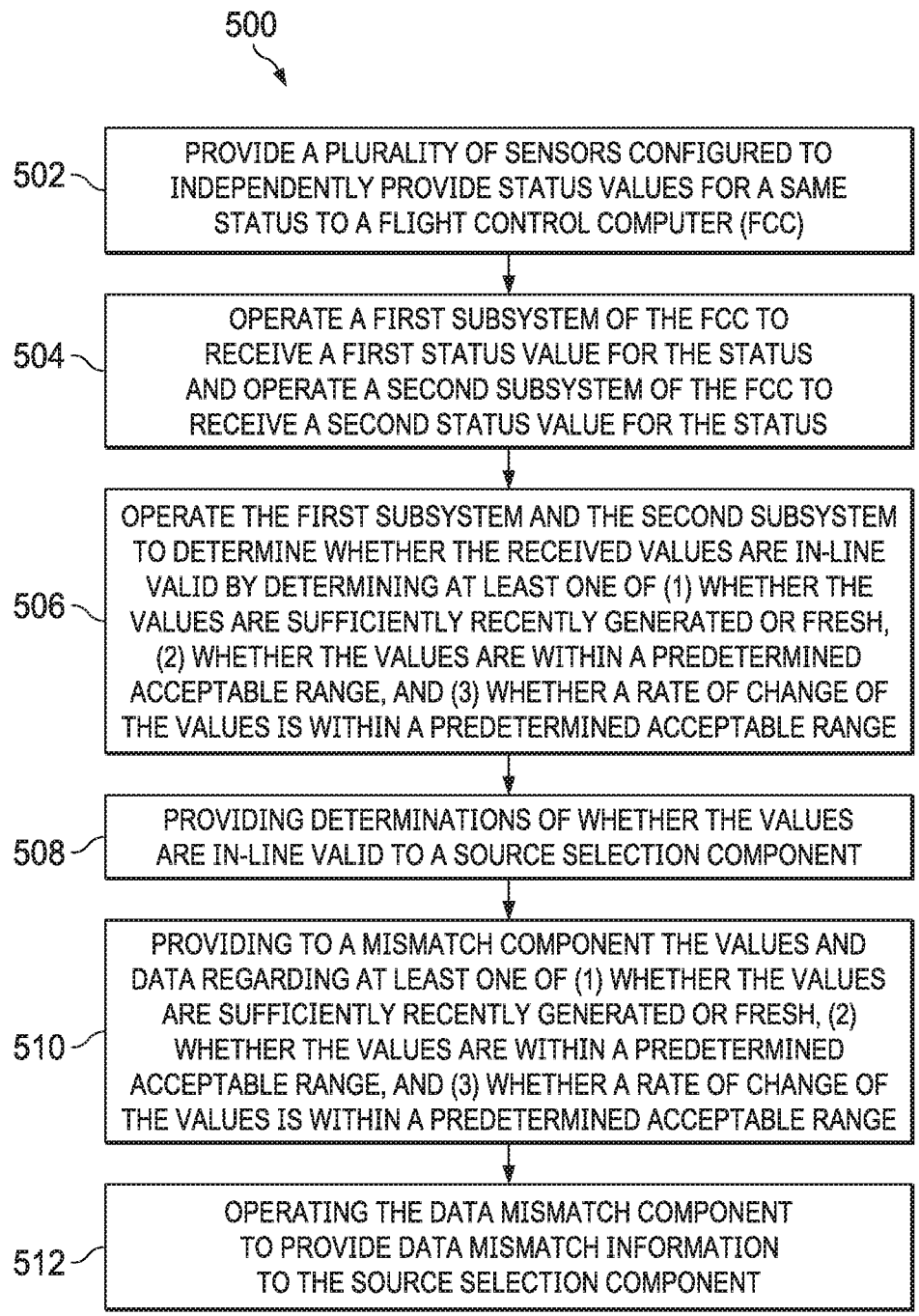
FIGS. 4A and 4B shows a flowchart of a method of operating the FCC of FIG. 1.

Referring now to FIG. 4A, a flowchart of a method 500 of operating the FCC 200 is shown. Method 500 can begin at block 502 by providing a plurality of sensor packages configured to independently provide status values for a same status to an FCC. The method 500 can progress to block 504 to operate a first subsystem of the FCC to receive a first status value for the status and to operate a second subsystem of the FCC to receive a second status value for the status. The method 500 can progress to block 506 to operate the first subsystem and the second subsystem to determine whether the received values are in-line valid by determining at least one of (1) whether the values are sufficiently recently generated or fresh, (2) whether the values are within a predetermined acceptable range, and (3) whether a rate of change of the values is within a predetermined acceptable range. The method 500 can continue to block 508 by providing determinations of whether the values are in-line valid to a source selection component. The method 500 can continue to block 510 to provide to a mismatch component the values and data regarding at least one of (1) whether the values are sufficiently recently generated or fresh, (2) whether the values are within a predetermined acceptable range, and (3) whether a rate of change of the values is within a predetermined acceptable range. The method 500 can continue to block 512 to operate the data mismatch component to provide data mismatch information to the source selection component.

Figure 4B:
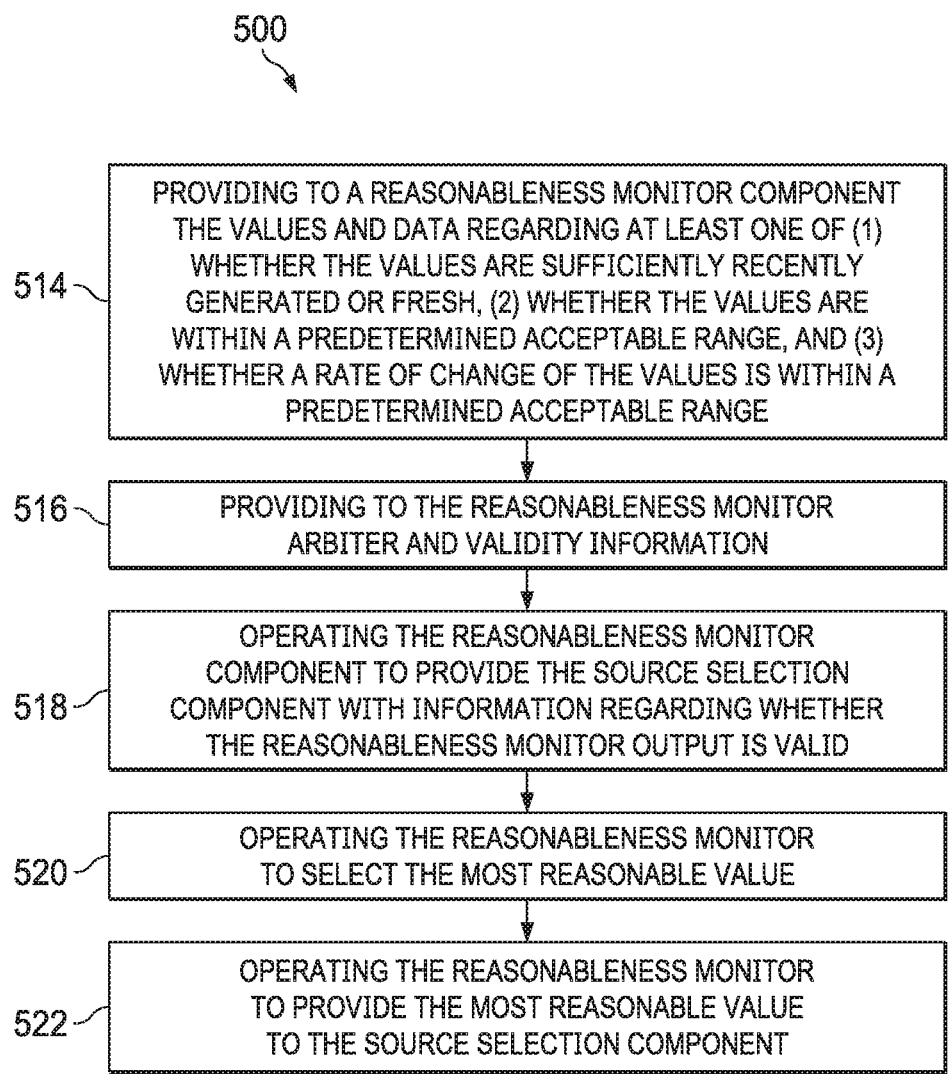

Referring to FIG. 4B, the method 500 can continue to block 514 to provide to a reasonableness monitor component the values and data regarding at least one of (1) whether the values are sufficiently recently generated or fresh, (2) whether the values are within a predetermined acceptable range, and (3) whether a rate of change of the values is within a predetermined acceptable range. Method 500 can progress to block 516 to provide to the reasonableness monitor arbiter and validity information. Method 500 can progress to block 518 to operate the reasonableness monitor component to provide the source selection component with information regarding whether the reasonableness monitor output is valid. The method 500 can continue to block 520 to operate the reasonableness monitor to select the most reasonable value. Finally, method 500 can progress to block 522 to operate the reasonableness monitor to provide the most reasonable value to the source selection component.

Figure 5:
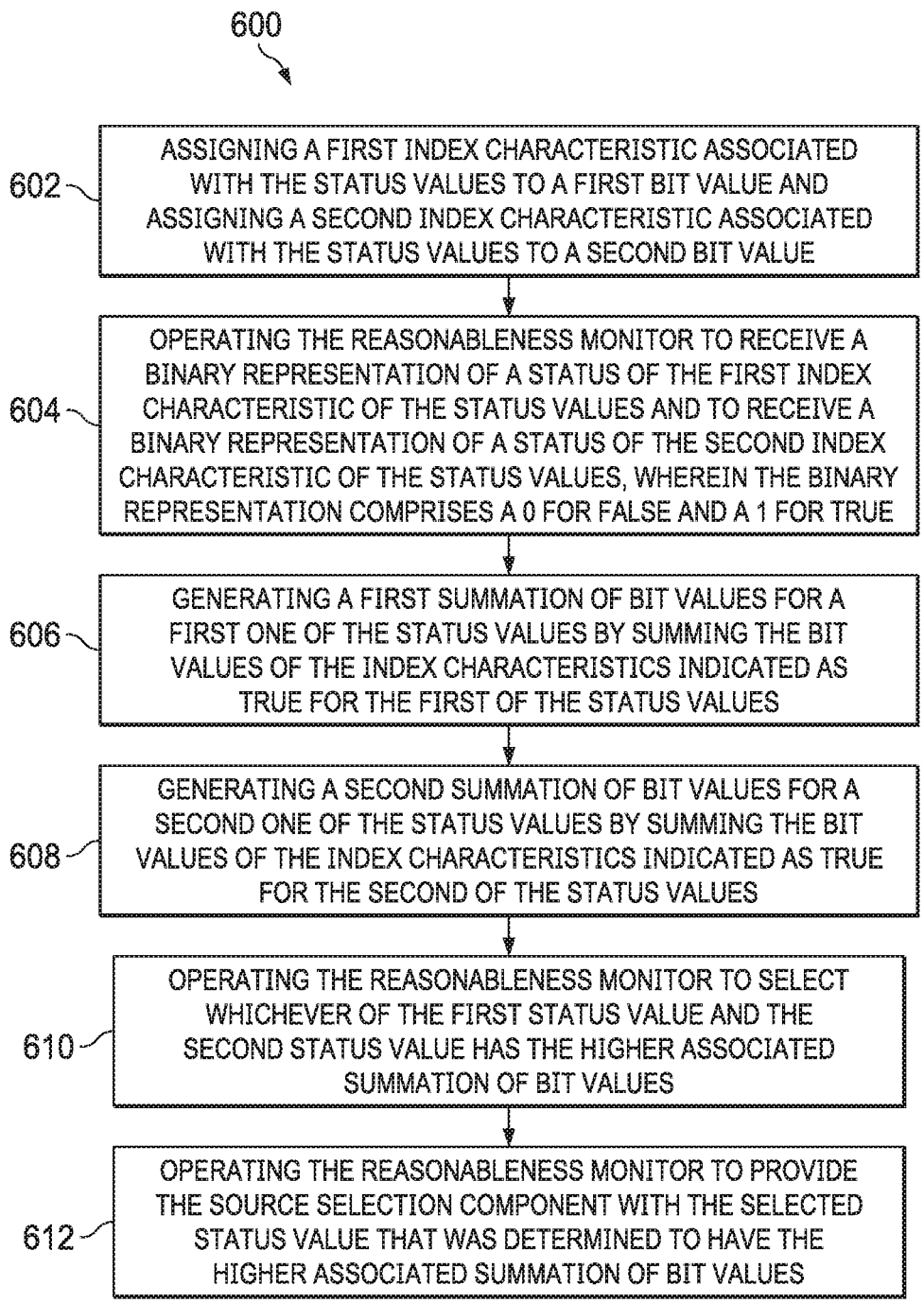
FIG. 5 shows flowchart of a method of operating the reasonableness monitor of FIG. 3.

Referring now to FIG. 5, a flowchart of a method 600 of operating the reasonableness monitor component 300 is shown. Method 600 can begin operation at block 602 to assign a first index characteristic associated with the status values to a first bit value and assigning a second index characteristic associated with the status values to a second bit value. Method 600 can progress to block 604 to operate the reasonableness monitor to receive a binary representation of a status of the first index characteristic of the status values and to receive a binary representation of a status of the second index characteristic of the status values, wherein the binary representation comprises a 0 for false and a 1 for true. Method 600 can further progress to block 606 to generate a generate a first summation of bit values for a first one of the status values by summing the bit values of the index characteristics indicated as true for the first of the status values. Method 600 can progress to block 608 to generate a second summation of bit values for a second one of the status values by summing the bit values of the index characteristics indicated as true for the second of the status values. Method 600 can then progress to block 610 to operate the reasonableness monitor to select whichever of the first status value and the second status value has the higher associated summation of bit values. Finally, method 600 can progress to block 612 to operate the reasonableness monitor to provide the source selection component with the selected status value that was determined to have the higher associated summation of bit values.

Referring now to FIG. 6, a table 700 of example calculations of the first and second index calculation components (ICCs) 400, 400' are shown. In this example, the ICCs 400, 400' are configured to receive indications of for each of AD-1 status and AD-2 status whether a label is local in-line valid (Bit 4), whether the unit has the most labels that are in-line valid (Bit 3), and whether the operating mode is not degraded (Bit 2). When an indication is true, a value of 1 is assigned while when an indication is not true, a value of 0 is assigned. A value of 1 for Bit 4 is worth 16, a value of 1 for Bit 3 is worth 8, and a value of 1 for Bit 2 is worth 4. The ICCs are further configured to calculate an index total for each of the AD-1 status values and the AD-2 status values. In situations where the index value of one AD is higher than the other ADs, the reasonableness monitor components 300 are configured to indicate to the source selection components that the AD with the highest index value is the most reasonable value. Subsequently, the aircraft can be operated using the most reasonable value. In cases such as shown in FIG. 6 where the index values of the ADs are the same, the aircraft can be operated according to a default value.

To put the example of FIG. 6 into further context, AD-1 status values could be associated with an altitude value reported by a sensor package and the AD-2 status values could be associated with an altitude value reported by another sensor package. If the AD-1 sensor package reports an altitude of 10,000 feet and the AD-2 sensor package reports an altitude of 20,000 feet, there is a need to determine which of the altitudes is the most reasonable. Accordingly, the systems disclosed herein determine true or false values for the various reasonableness. In the example of FIG. 6, the reasonableness monitor components have determined that the index values are each 20 (16*1+8*0+4*2=20). When the index values of all ADs are the same, the aircraft can operate on an assumed or predetermined value. For example, since flying higher may more generally be safer in a mountainous region, the aircraft may be configured to operate as if the 10,000 foot reported altitude is accurate, thereby causing the aircraft to climb to an altitude, as measured by the sensor package that previously reported the 10,000 foot altitude, that is considered safe. If in fact the aircraft was actually at 20,000 feet, the aircraft may climb unnecessarily but safely, nonetheless. In this case, the reasonableness monitor components were not able to provide the desired added value of selecting a value more likely to be accurate.

Referring now to FIG. 7, a system similar to the system of FIG. 6 is represented but with different example true or false values. In the example of FIG. 7, AD-1 has an index value of 16 (16*1+8*0+4*0=16) while AD-2 has an index value of 28 (16*1+8*1+4*1=28). Accordingly, the reasonableness monitor component will indicate to the source selection component that the value reported by the sensor package associated with AD-2 is more reasonable than the value reported by the sensor package associated with AD-1. In this case, the reasonableness monitor components were able to provide the desired added value of selecting a value more likely to be accurate.

Referring now to FIG. 7, a system similar to the system of FIG. 6 is represented but with different example true or false values. In the example of FIG. 7, AD-1 has an index value of 16 (16*1+8*0+4*0=16) while AD-2 has an index value of 28 (16*1+8*1+4*1=28). Accordingly, the reasonableness monitor component will indicate to the source selection component that the value reported by the sensor package associated with AD-2 is more reasonable than the value reported by the sensor package associated with AD-1. In this case, the reasonableness monitor components were able to provide the desired added value of selecting a value more likely to be accurate.

Referring now to FIG. 8, a system similar to the system of FIG. 6 is represented but further utilizing two additional indications that can assist the reasonableness monitor component make an improved decision regarding which reported AD value is most reasonable to rely on. In this example, the sensor packages can comprise components configured to report air speed of the aircraft. In some cases, global positioning system (GPS) time-stamped coordinates can be used as an alternative source of data for determining airspeed. Accordingly, the system of FIG. 8 is configured not only to use the indications of FIG. 6 with regard to the health of the sensor package and sensor value reporting system, but is also configured to determine which of the AD values indicates that a GPS threshold check has passed (Bit 1 and true value worth 2) and whether the AD is supplying an airspeed value closest to the airspeed indicated by GPS information alone (Bit 0 and true value worth 1). In this example, AD-1 has an index value of 16 (16*1+8*0+4*0+2*0+1*0=16) while AD-2 has an index value of 19 (16*1+8*0+4*0+2*1+1*1=19). As such, the reasonableness monitor component would report the airspeed value reported by the sensor package AD-2 as the most reasonable value to base operation of the aircraft on.

Referring now to FIG. 9, a system similar to the system of FIG. 8 is represented but further comparing three potential most reasonable value by including an AD-3 that is provided by a third air data computer (not shown). This example is useful in demonstrating a situation where one of three sensor packages is not local in-line valid (out of commission). The 0 value in the first column for AD-3 indicates that the value provided by AD-3 is not in-line valid. The two other values provided by AD-1 and AD-2 are indicated as in-line valid, but the values do not match. In this example, AD-1 has an index value of 16 (16*1+8*0+4*0+2*0+1*0=16) while AD-2 has an index value of 31 (16*1+8*1+4*1+2*1+1*1=31). As such, the reasonableness monitor component would report the value reported by the sensor package AD-2 as the most reasonable value to base operation of the aircraft on.

Referring now to FIG. 10, a system similar to the system of FIG. 9 is represented. This example is useful in demonstrating a situation where the decision of which of the three reported values is most reasonable hinges on the GPS related criteria. In this example, AD-1 has an index value of 22 (16*1+8*0+4*1+2*1+1*0=22), AD-2 also has an index value of 22 (16*1+8*0+4*1+2*1+1*0=22), but AD-3 has an index value of 23 (16*1+8*0+4*1+2*1+1*1=23). As such, the reasonableness monitor component would report the value reported by the sensor package AD-3 as the most reasonable value to base operation of the aircraft on.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A flight control computer (FCC), comprising:
  an index calculation component (ICC) configured to compare a reasonableness of at least a first value of a variable provided by a first air data computer of the FCC and a second value of the variable provided by a second air data computer of the FCC;
  wherein the ICC is a programmed portion of the FCC configured to calculate a first index value for the first value and a second index value for the second value;
  wherein the first index value and the second index value are calculated as a function of assigning a Bit Number and a Bit Value to at least two of questions (1) whether the first and second index values are in-line valid, (2) whether the first and second index values are provided by whichever of the first air data computer and the second air data computer that has provided the most values that are in-line valid, (3) whether an operating mode of the respective air data computers is not degraded, (4) whether a global positioning system threshold check has passed for the respective systems supplying GPS data to the ICC, and (5) whether the first value and the second value are closest to a GPS comparison reference; and
  wherein the FCC is configured to control flight of an aircraft as a function of a determination of the ICC, wherein the determination of the ICC dictates which of the first value and the second value is relied upon to control flight of the aircraft.

2. The FCC of claim 1, wherein the first index value and the second index value are calculated as a function of whether the first and second index values are in-line valid.

3. The FCC of claim 1, wherein the first index value and the second index value are calculated as a function of whether the first and second index values are provided by an air data computer that has provided the most values that are in-line valid.

4. The FCC of claim 1, wherein the first index value and the second index value are calculated as a function of whether an operating mode of the respective air data computers is not degraded.

5. The FCC of claim 1, wherein the first index value and the second index value are calculated as a function of whether a global positioning system threshold check has passed for the respective systems supplying GPS data to the ICC.

6. The FCC of claim 1, wherein the first index value and the second index value are calculated as a function of whether the first value and the second value are closest to a GPS comparison reference value.

7. The FCC of claim 1, wherein (1) whether the first and second index values are in-line valid is assigned a Bit Number of 4 and a Bit Value of 16, (2) whether the first and second index values are provided the associated first air data computer and second air data computer that has provided the most values that are in-line valid is assigned a Bit Number of 3 and a Bit Value of 8, (3) whether an operating mode of the respective air data computers is not degraded is assigned a Bit Number of 2 and a Bit Value of 4, (4) whether a global positioning system threshold check has passed for the respective systems supplying GPS data to the ICC is assigned a Bit Number of 1 and a Bit Value of 2, and (5) whether the first value and the second value are closest to a GPS comparison reference is assigned a Bit Number of 0 and a Bit Value of 1.

8. The FCC of claim 7, wherein the first and second index values are calculated by summing the Bit Values for each true question associated with the respective first and second index values.

9. A method of operating a flight control computer (FCC), comprising:
  providing an index calculation component (ICC) configured to compare a reasonableness of at least a first value of a variable provided by a first air data computer of the FCC and a second value of the variable provided by a second air data computer of the FCC;
  wherein the ICC is a programmed portion of the FCC configured to calculate a first index value for the first value and a second index value for the second value; and
  wherein the first index value and the second index value are calculated as a function of assigning a Bit Number and a Bit Value to at least two of questions (1) whether the first and second index values are in-line valid, (2) whether the first and second index values are provided by whichever of the first air data computer and the second air data computer that has provided the most values that are in-line valid, (3) whether an operating mode of the respective air data computers is not degraded, (4) whether a global positioning system threshold check has passed for the respective systems supplying GPS data to the ICC, and (5) whether the first value and the second value are closest to a GPS comparison reference; and wherein the FCC is configured to control flight of an aircraft as a function of a determination of the ICC, wherein the determination of the ICC dictates which of the first value and the second value is relied upon to control flight of the aircraft.

10. The method of claim 9, wherein the first index value and the second index value are calculated as a function of whether the first and second index values are in-line valid.

11. The method of claim 9, wherein the first index value and the second index value are calculated as a function of whether the first and second index values are provided by an air data computer that has provided the most values that are in-line valid.

12. The method of claim 9, wherein the first index value and the second index value are calculated as a function of whether an operating mode of the respective air data computers is not degraded.

13. The method of claim 9, wherein the first index value and the second index value are calculated as a function of whether a global positioning system threshold check has passed for the respective systems supplying GPS data to the ICC.

14. The method of claim 9, wherein the first index value and the second index value are calculated as a function of whether the first value and the second value are closest to a GPS comparison reference value.

15. The method of claim 9, wherein (1) whether the first and second index values are in-line valid is assigned a Bit Number of 4 and a Bit Value of 16, (2) whether the first and second index values are provided by whichever of the first air data computer and second air data computer that has provided the most values that are in-line valid is assigned a Bit Number of 3 and a Bit Value of 8, (3) whether the operating mode of the respective air data computers is not degraded is assigned a Bit Number of 2 and a Bit Value of 4, (4) whether a global positioning system threshold check has passed for the respective systems supplying GPS data to the ICC is assigned a Bit Number of 1 and a Bit Value of 2, and (5) whether the first value and the second value are closest to a GPS comparison reference is assigned a Bit Number of 0 and a Bit Value of 1.

16. The method of claim 15, wherein the first and second index values are calculated by summing the Bit Values for each true question associated with the respective first and second index values.

* * * * *